United States Patent
Ciccarelli et al.

(10) Patent No.: US 9,699,857 B1
(45) Date of Patent: Jul. 4, 2017

(54) METHOD FOR CONTROLLING A TUNABLE WHITE FIXTURE USING A SINGLE HANDLE

(71) Applicant: ABL IP Holding LLC, Decatur, GA (US)

(72) Inventors: David Ciccarelli, Johns Creek, GA (US); Daniel Aaron Weiss, Tucker, GA (US); Benjamin Marshall Suttles, Stockbridge, GA (US)

(73) Assignee: ABL IP Holding LLC, Decatur, GA (US)

( * ) Notice: Subject to any disclaimer, the term of this patent is extended or adjusted under 35 U.S.C. 154(b) by 0 days.

(21) Appl. No.: 15/158,078

(22) Filed: May 18, 2016

(51) Int. Cl.
H05B 33/08 (2006.01)

(52) U.S. Cl.
CPC ..... *H05B 33/0857* (2013.01); *H05B 33/0845* (2013.01); *H05B 33/0884* (2013.01)

(58) Field of Classification Search
CPC ............ H05B 33/0845; H05B 33/0857; H05B 33/086; H05B 33/0863; H05B 37/02; Y02B 20/48; F21Y 2115/10; F21Y 2101/00
USPC .......................... 315/291, 294, 307, 312, 159
See application file for complete search history.

(56) References Cited

U.S. PATENT DOCUMENTS

| | | | |
|---|---|---|---|
| 7,119,500 B2 | 10/2006 | Young | |
| 7,119,501 B2 | 10/2006 | Young | |
| 7,902,560 B2 | 3/2011 | Bierhuizen et al. | |
| 8,008,850 B2 | 8/2011 | Su et al. | |
| 8,203,260 B2 | 6/2012 | Li et al. | |
| 8,324,815 B2 | 12/2012 | Maxik et al. | |
| 8,358,089 B2 | 1/2013 | Hsia et al. | |
| 8,436,549 B2 | 5/2013 | Hasnain | |
| 8,476,829 B2 | 7/2013 | Maxik et al. | |
| 8,491,159 B2 * | 7/2013 | Recker | H02J 9/02 362/20 |
| 8,702,271 B2 | 4/2014 | Rains, Jr. et al. | |
| 8,766,555 B2 | 7/2014 | Tu et al. | |
| 8,773,337 B2 | 7/2014 | Li et al. | |
| 8,783,887 B2 | 7/2014 | Caruso et al. | |
| 8,783,901 B2 | 7/2014 | Zoorob et al. | |
| 8,823,289 B2 | 9/2014 | Linz et al. | |
| 8,847,477 B2 | 9/2014 | Kawashima et al. | |

(Continued)

OTHER PUBLICATIONS

Sun, "Challenges and opportunities for high power white LED development," DOE SSL R&D Workshop, Feb. 1, 2012, 13 pages.

(Continued)

*Primary Examiner* — Haissa Philogene
(74) *Attorney, Agent, or Firm* — Kilpatrick Townsend & Stockton, LLP

(57) ABSTRACT

A system allows a light fixture to have a wider range of color temperatures (CCT) while limiting the warmest temperature reached at full intensity. The CCT of the light output may be controlled independently of intensity across a certain range of CCT and dependent on intensity across another range. In an implementation, both intensity and CCT may be adjusted from a single handle, where the interface positions may be divided into multiple zones. In another implementation, intensity may be adjusted from a first handle, while CCT may be adjusted from a second handle. The CCT of the light output may be limited to cooler levels when the intensity is higher, and/or the intensity of the light may be limited to lower levels when the CCT is warmer.

21 Claims, 9 Drawing Sheets

(56) References Cited

U.S. PATENT DOCUMENTS

| | | | |
|---|---|---|---|
| 8,928,249 B2 | 1/2015 | Raj et al. | |
| 9,326,343 B2 * | 4/2016 | Yan | H05B 33/0845 |
| 9,562,671 B2 * | 2/2017 | Davis | F21V 7/22 |
| 2009/0026913 A1 | 1/2009 | Mrakovich | |
| 2010/0084992 A1 | 4/2010 | Valois et al. | |
| 2010/0225241 A1 | 9/2010 | Maehara et al. | |
| 2012/0038291 A1 | 2/2012 | Hasnain | |
| 2012/0119658 A1 | 5/2012 | McDaniel | |
| 2013/0113394 A1 | 5/2013 | Ido et al. | |
| 2014/0265882 A1 | 9/2014 | Laski et al. | |
| 2014/0300283 A1 | 10/2014 | Lee et al. | |
| 2014/0300284 A1 | 10/2014 | Lee et al. | |
| 2014/0312777 A1 | 10/2014 | Shearer et al. | |
| 2015/0036316 A1 | 2/2015 | Lin et al. | |
| 2015/0084534 A1 | 3/2015 | Fukuda et al. | |
| 2015/0091472 A1 | 4/2015 | Kadotani et al. | |
| 2015/0115823 A1 | 4/2015 | Serra et al. | |
| 2015/0173151 A1 | 6/2015 | Ter Weeme et al. | |

OTHER PUBLICATIONS

Notice of Allowance for U.S. Appl. No. 15/158,100, mailed Nov. 21, 2016, 9 pages.

* cited by examiner

METHOD FOR CONTROLLING A TUNABLE WHITE FIXTURE USING A SINGLE HANDLE

RELATED APPLICATIONS

The present application is related to U.S. Ser. No. 15/158,100 filed concurrently herewith, which is incorporated herein by reference.

FIELD OF THE INVENTION

This invention relates generally to dimming of light fixtures, and more specifically to methods of energy-efficient dimming at different color temperatures.

BACKGROUND OF THE INVENTION

Lighting trends in residential and commercial applications are taking advantage of the increased dimming and color control offered by LED light fixtures. However, the efficiency of a fixture is affected by the color and intensity level of the light output. Energy codes are starting to incorporate color tunable products and expectations for efficiency across the tunable range. Thus, there is a need for a lighting product which is efficient across a wide range of intensities and color temperatures.

There is a demand for light sources that produce adjustable white light across a range of correlated color temperatures (CCT or color temperature), such as from about 6000K to about 1800K; products of this type are often called tunable white products. There is also a demand for light sources that provide light with a warm color temperature, such as from about 2700K to about 1800K, especially if the light intensity may be dimmed; products of this type are often called warm dimming products. Additionally, there is a demand for high-efficiency lighting products, to improve energy budgets and to meet energy efficiency standards. However, when using LED light fixtures, warmer color temperatures are historically of lower efficiency, as LEDs of warmer colors require a less efficient phosphor coating to counteract the blue color of the underlying diode, necessitating more and brighter LEDs to reach a given level of illumination. In existing products, a product is typically either a warm dimming product or a tunable white product. It is desirable to have a product with benefits of both without suffering decreased energy efficiency at lower CCTs.

BRIEF SUMMARY

The described system and control method allows a light fixture to have a wider range of color temperatures while limiting the warmest temperature reached at full intensity. The CCT and the intensity of the light output may be controlled independently across a certain range, and may be dependent across another range. In an implementation of the system, the light output may have allowed combinations of CCT and intensity.

In an implementation of the system, a light fixture may be configured to provide a range of CCT (e.g., from about 1800K to about 6000K), and a range of light output intensity (e.g., from about 0% output to about 100% output). In a further implementation, the particular levels of the CCT and the intensity may be controlled by a driver, such as an LED driver, and a programmed controller, such as a microprocessor, may control the driver and receive values from a user interface. In another implementation, one or more user interfaces, or handles, may provide control inputs having a value. A value associated with a control input may be received by the programmed controller, such that the controller may control the driver, and the driver may adjust the light output based on the received value. In one implementation, sometimes referred to as single-handle control, both intensity and CCT of one or more light fixtures may be adjusted based on received values from a single handle. In an alternative implementation, sometimes referred to as dual-handle control, intensity of the one or more light fixtures may be adjusted based on received values from a first handle, while CCT may be adjusted based on received values from a second handle. Further implementations may comprise additional handles to provide adjustments for additional parameters such as delta-uv (i.e., tint), color (e.g., red-green-blue blends), color rendering index (CRI), circadian stimulus, TM-30 metrics, spatial arrangements, or other qualities of the light output.

In an implementation featuring single-handle control, a single handle may provide a value to a controller, wherein the value is related to a relative position of the single handle based on an available range of possible positions. In a further implementation, the available range of positions may be divided into two or more zones; zones may be overlapping or non-overlapping. In another implementation, the controller may determine a requested value from the value received from the single handle, and the controller may further determine that the requested value corresponds to light output within a range of intensity levels (e.g., from about 0% intensity to about 100% intensity) and within a range of CCT levels (e.g., from about 1800K to about 6000K). In yet a further implementation, the controller may determine a correspondence between the requested value and the CCT level when the received value is within a first zone, and a correspondence between the requested value and the intensity and CCT levels when the received value is outside of the first zone.

In an implementation featuring dual-handle control, a controller may receive values from a first handle and a second handle, wherein each received value is related to a relative position of each handle. In a further implementation, the value received from the first handle may be associated with a requested intensity, and the value received from the second handle may be associated with a requested color temperature. In a further implementation, the controller may receive a value from the one or more handles and determine a requested value from the received value. In a further implementation, the controller may determine that the requested value corresponds to an allowed combination of color temperature and intensity, or the controller may adjust the requested value to obtain an allowed combination of color temperature and/or intensity. In another implementation, the controller may control the LED driver such that the light fixture produces color temperature output and intensity output corresponding to either the allowed combination or the obtained combination. In a non-limiting example of this implementation, the CCT of the light output may be limited to cooler levels when the intensity is higher, and/or the intensity of the light may be limited to lower levels when the CCT is warmer.

For both single- and dual-handle implementations, the available range of positions of a handle may be divided with an additional zone, and input from the handle may adjust a different light parameter of the light output, such as delta-uv (i.e., tint), color (e.g., red-green-blue blends), color rendering index (CRI), circadian stimulus, TM-30 metrics, spatial arrangements, or other parameters, when the handle position is within the additional zone. The adjustment of any parameter of the light output may have a linear relation to the position of the handle, a non-linear relation, a step-wise relation, or any other suitable relation. The relative relation of the handle position and the light parameter may change during operation, for example in a dual-handle implementation, or for a first zone compared to a second zone.

The values, ranges, and thresholds provided herein are exemplary only, and may be changed without departing from the scope and spirit of the invention. Similarly, relative positions of the handle controls are exemplary, and different relative positions may be used without departing from the described invention.

BRIEF DESCRIPTION OF THE DRAWINGS

FIGS. 1a and 1b may be collectively referred to as FIG. 1.

DETAILED DESCRIPTION

Figure 1A:
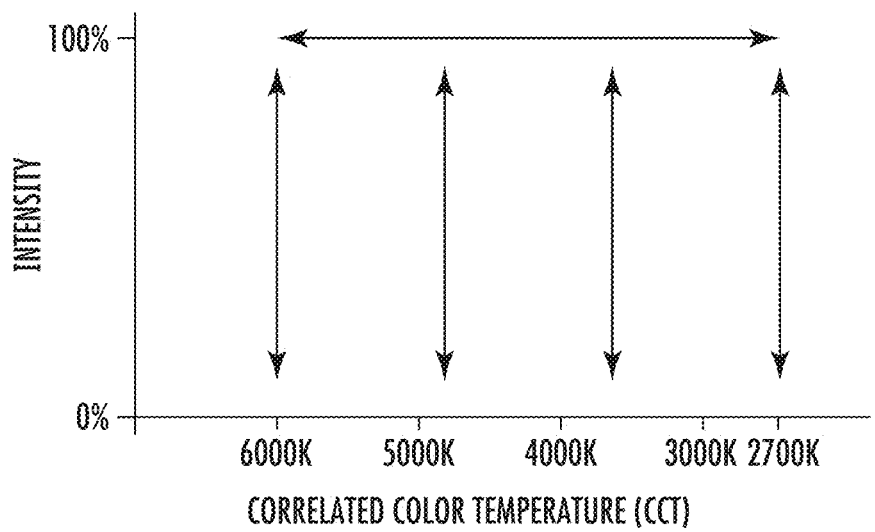
FIG. 1a is a chart showing an example value range for an example tunable white fixture.

The behavior of several types of existing products are depicted in FIG. 1. FIG. 1a depicts some ranges of an example tunable white product. In this example, the product may be adjustable across a range of CCT values, such as from 2700K to 6000K. Adjusting a tunable white product may cause the product to produce light at a certain color temperature within the range. The example product may also allow the intensity of the light to be adjusted such as the example intensity range of 0-100% shown in FIG. 1a. In existing products of this type, the very warm CCTs, such as below 2700K, may be not implemented, so the efficiency rating at full intensity is not negatively affected by the warm CCT values.

Figure 1B:
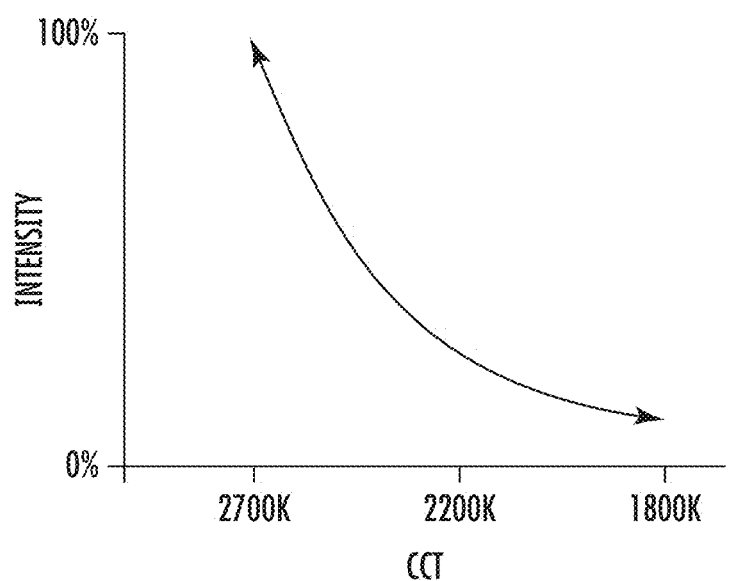
FIG. 1b is a chart showing an example value range for an example warm dimming fixture.

FIG. 1b depicts some ranges of an example existing warm dimming product. Adjusting an example product of this type may cause the light output to vary in both intensity and in color temperature. For example, the coolest available CCT may have an intensity of about 100%, while the warmest available CCT may have an intensity of about 0%.

Single-Handle Control

Figure 2A:
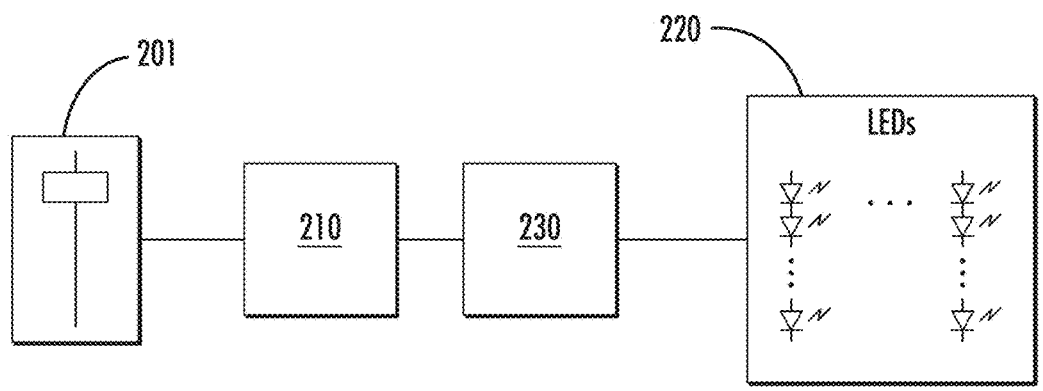
FIG. 2a is a block diagram representing an exemplary single-handle implementation of the system.

FIG. 2a depicts an exemplary single-handle implementation of the disclosed system. The single handle 201 of the system may be encompassed by a user interface, and may include any type of user interface—e.g., sliding switch, rotary knob, touchpad, buttons, etc. Although not depicted, the handle may be an electronic interface representing the user's intended interactions with the system, such as a text message, and such implementations are deemed to be within the scope of the present disclosure. The handle 201 may be associated with a user input, and the user input may be received as a value corresponding to a color temperature and an intensity. The value may be received at a controller 210. The controller 210 may be programmed to control an LED driver 230, and the LED driver 230 may control multiple groups of LEDs 220. The LED driver 230 may instruct the LED groups 220 to produce light output based upon the values received by the controller 210.

In a further implementation of the single-handle system depicted in FIG. 2a, the handle 201 may have a range of possible positions (e.g., from minimum handle position to maximum handle position). A handle position may be associated with a value, and a range of positions may be associated with a zone of values. The available range of possible positions may be divided into two or more zones (e.g., from about minimum position to an intermediate position, and from the intermediate position to about maximum position). The controller 210 may receive a particular value, determine if the received value is within a particular zone of values, and determine the light parameters that are associated with the value. For example, the controller may determine that a received value corresponds to a particular color temperature and particular intensity. The controller 210 may then control the LED driver 230 to produce light output corresponding to the particular color temperature and intensity associated with the received value.

In a further implementation of the example system depicted in FIG. 2a, the controller 210 may control the LED driver differently depending on whether or not the particular received value are within a particular zone of values. In a non-limiting example, the controller 210 may determine that a first received value is within a first zone of values. The controller may then determine that the first value corresponds to a first color temperature, and instruct the LED driver 230 to produce light output corresponding to a predetermined intensity (e.g., about 100%) and the first color temperature. The predetermined intensity may be similar for a range of color temperatures (e.g., about 100% for color temperatures between 2700K and 6000K), or may vary over a range of color temperatures (e.g., between about 90% to about 100% for color temperatures between 2700K and 6000K)

In the same non-limiting example, the controller may determine that a second received value is outside the first zone of values. The controller may then determine that the second value corresponds to a second intensity level and second color temperature level, and instruct the LED driver 230 to produce light output corresponding to the second intensity and color temperature levels, such that the second color temperature level is warmer than the first color temperature, and the second intensity level is less than the predetermined intensity.

Figure 3:
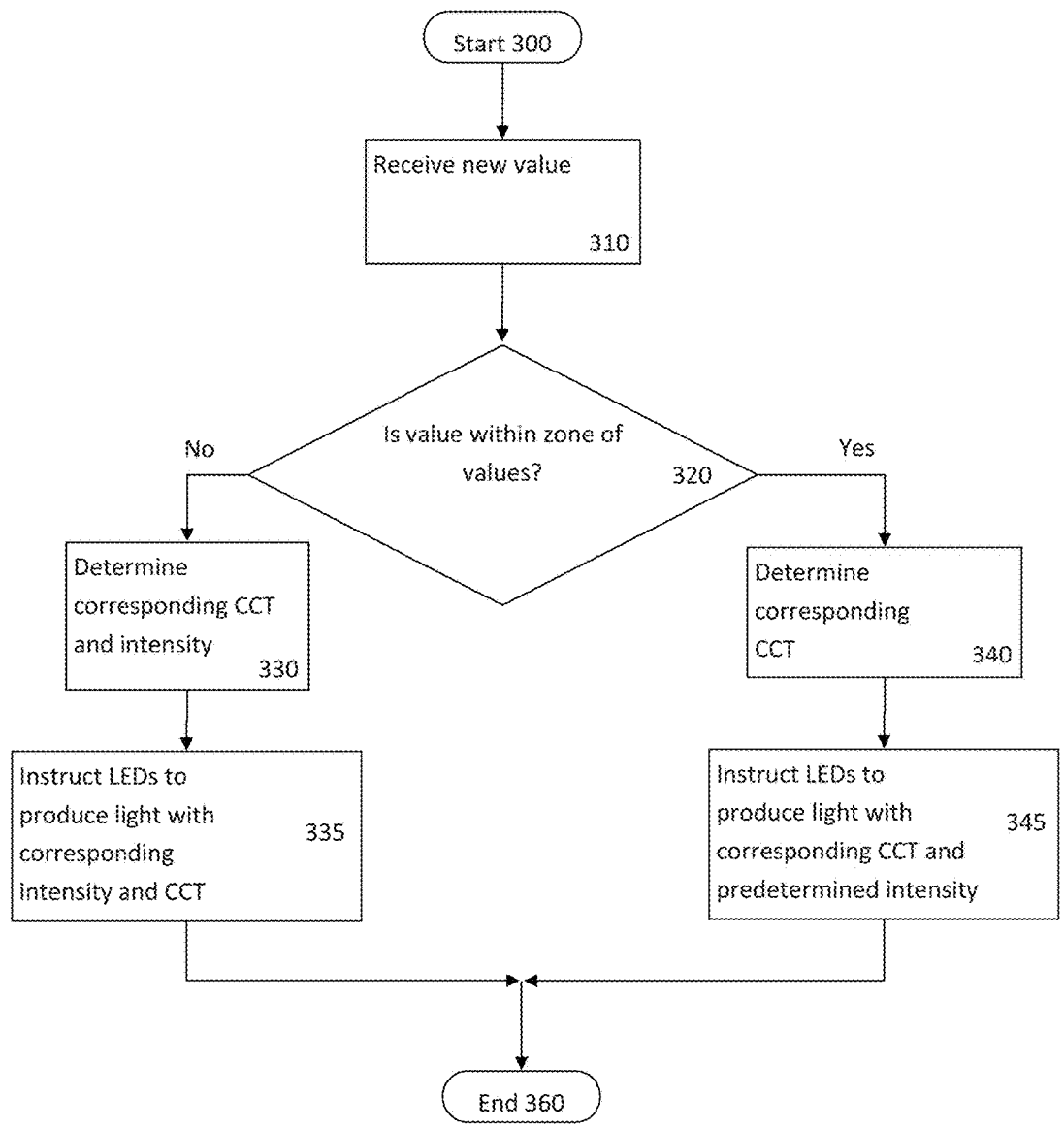
FIG. 3 is a flowchart representing exemplary steps for an implementation of single-handle control by a programmed controller.
Figure 4A:
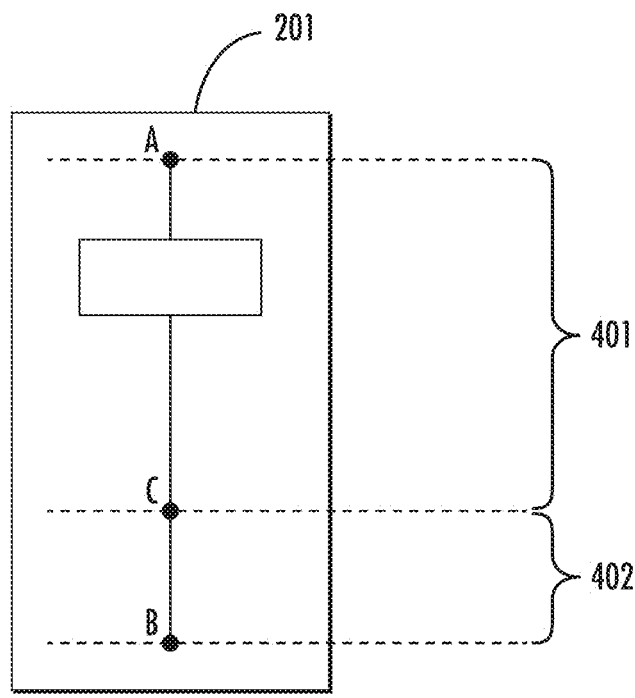
FIG. 4a is a diagram depicting an exemplary set of zones in a single-handle implementation.
Figure 4B:
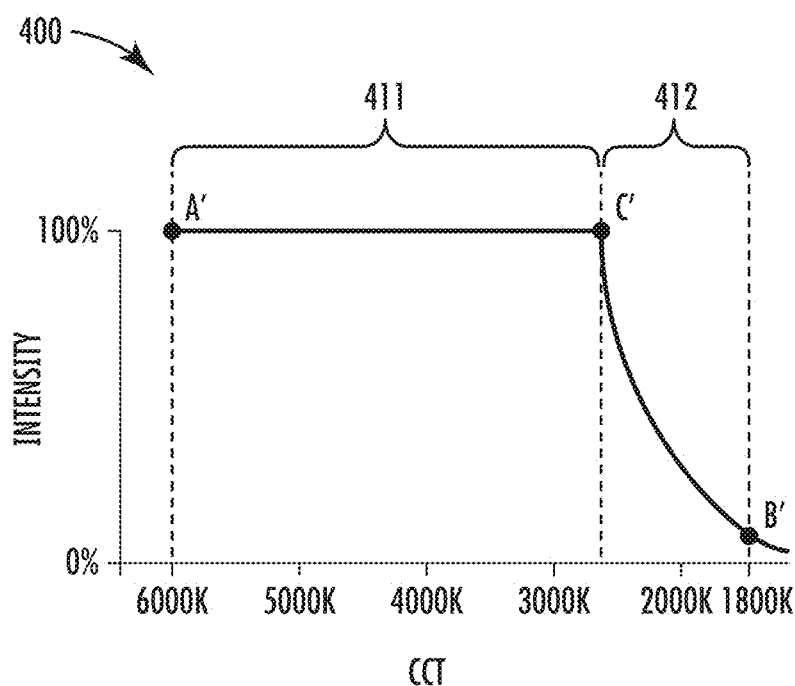
FIG. 4b is a chart of an exemplary range of levels related to zones for a single-handle implementation.

For a single-handle implementation, the programming of the controller 210 may follow the flowchart depicted in FIG. 3. FIGS. 4a and 4b may aid understanding of such an implementation. At starting point 300 of FIG. 3, the light output as controlled by the LED driver 230 may be in a default mode at a predetermined intensity and CCT, or it may be at the last known output, or the light fixture may be turned off. When the handle 201 receives a user input and provides a related value, the controller 210 may receive the value at step 310. The controller may determine at step 320 if the new value is within a first zone of values, or if it is outside of the zone. If the new value is within the first zone of values (e.g., corresponds to a position within zone 401 of FIG. 4a), the controller at step 340 may determine the CCT level corresponding to the value. At step 345, the controller may control the LED driver 230 to instruct the LED groups 220 to produce light output corresponding to the color temperature level determined in step 340 and to a predetermined intensity level. If the new value is outside of the first zone (e.g., corresponds to a position within zone 402 of FIG. 4a), the controller at step 330 may determine the CCT and intensity levels corresponding to the value. At step 335, the controller may control the LED driver to instruct the LED groups to produce light output corresponding to the CCT and intensity levels determined in step 330. After the light output is produced at step 335 or 345, the flowchart for the controller ends at ending point 360. If a further new value is received from the handle 201 (i.e., the user is still adjusting the handle), the controller may return to starting point 300 to follow the flowchart for the new value. If the received value is not being adjusted, the programming may end at step 360, and the controller may maintain the light output at the present color temperature and intensity. Additional steps relating to default modes, error-checking, or similar logical steps are envisioned, but are omitted from the example flowchart for clarity.

Relevant to a single-handle configuration, an exemplary set of zones and corresponding ranges of intensity and CCT levels are depicted in FIGS. 4a and 4b. The handle 201 may have a range of positions, such as from a maximum point A to a minimum point B. The range of positions may be further divided and associated with zones of values, such as a first zone 401 from the point A to an intermediate point C, and a second zone 402 from point C to point B. The range of positions and associated values within each zone may correspond to an available range of levels for the light output, such as depicted on chart 400. The zone 401 may correspond to a particular range of levels 411, such that adjusting the handle within the zone 401 may adjust the CCT of the light output along the range of levels 411, while the intensity of the light output is maintained at a predetermined level, such as about 100%, or within a predetermined range based on the CCT, such as about 95% to about 100%. The zone 402 may correspond to a second particular range of levels 412, such that adjusting the handle within the zone 402 may cause the intensity and/or CCT of the light output to be adjusted along the range of levels 412.

For example, positioning the handle 201 at or near point B in zone 402 may result in light output having an intensity at or near 0% and a CCT at or near 1800 K, corresponding to about point B' on chart 400. Adjusting the handle to a position between points B and C may result in light output having an intensity between 0% and 100% and a CCT between 1800 K and 2700 K, as shown by the line connecting points B' and C' in range 412. Further adjusting the handle to an example position at or near point C may result in light output having an intensity at or near 100% and a CCT at or near 2700 K, corresponding to about point C' on chart 400. Further adjusting the handle to an example position between points C and A may result in light output having an intensity of about 100% and a CCT between 2700 K and 6000 K as shown by the line connecting points C' and A' in range 411. Further adjusting the handle position to at or near point A may result in light output having an intensity at or near 100% and a CCT at or near 6000 K, corresponding to about point A' on chart 400.

Although not depicted in FIGS. 4a and 4b, the available range of positions of a single-handle implementation may be divided with an additional zone, and values from the handle may adjust a different light parameter of the light output, such as delta-uv (i.e., tint), color (e.g., red-green-blue blends), color rendering index (CRI), circadian stimulus, TM-30 metrics, spatial arrangements, or other parameters, when the handle position is within the additional zone. The controller 210 may control the LEDs 220 to produce light output based on the combination of intensity, color temperature, and/or the additional light parameters.

Dual-Handle Control

Figure 2B:
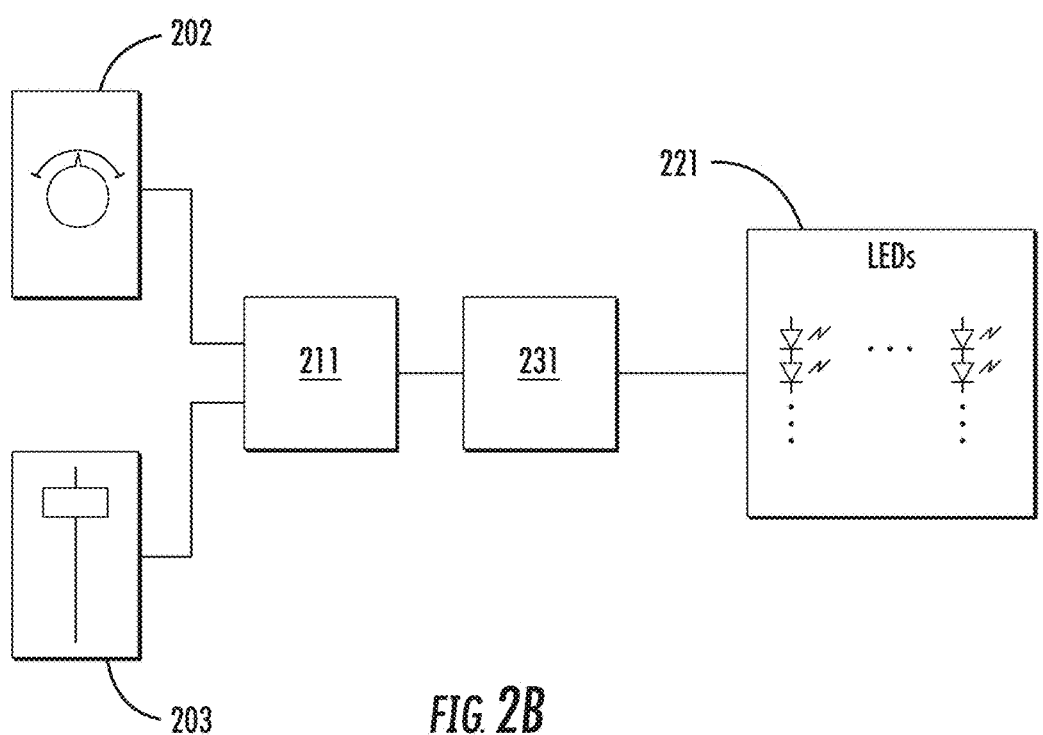
FIG. 2b is a block diagram representing an exemplary dual-handle implementation of the system.

FIG. 2b depicts an exemplary dual-handle implementation of the invention. The dual handles of the example may be encompassed by a first handle 202 and a second handle 203. Each handle 202 and 203 may be associated with a user input, and the user inputs may be received as one or more values corresponding to a color temperature and an intensity. Although not depicted, the handle may be an electronic interface representing the user's intended interactions with the system, such as a text message, and such implementations are deemed to be within the scope of the present disclosure. The value may be received by a controller 211. The controller 211 may be programmed to control an LED driver 231, and the LED driver 231 may control multiple groups of LEDs 221. The light output of the LED groups 221 may be adjusted by the LED driver 231 based upon the combination of the received values from handles 202 and 203.

In a further implementation of the example system depicted in FIG. 2b, the handles 202 and 203 may each have a range of possible positions. A handle position may be associated with a value. A value of the first handle 202 may correspond to a first light parameter while a value of the second handle 203 may correspond to a second light parameter. Additional light parameters could be implemented with a third handle (not shown), or with a zone of values on either the first or second handles. The controller 211 may receive values from each of the handles 202 and 203 as separate inputs or in combination, and the controller may also determine the corresponding light parameters and levels that are associated with the value. For example, the controller may determine that a value received from handle 202 is associated with a particular color temperature and that a value received from handle 203 is associated with a particular intensity. Alternatively or in addition, the controller may determine that a value received from either handle 202 or 203 is associated with both a particular color temperature and a particular intensity. The controller 211 may then control the LED driver 231 to instruct the LED groups 221 to produce light output corresponding to the particular color temperature and intensity.

Figure 6A:
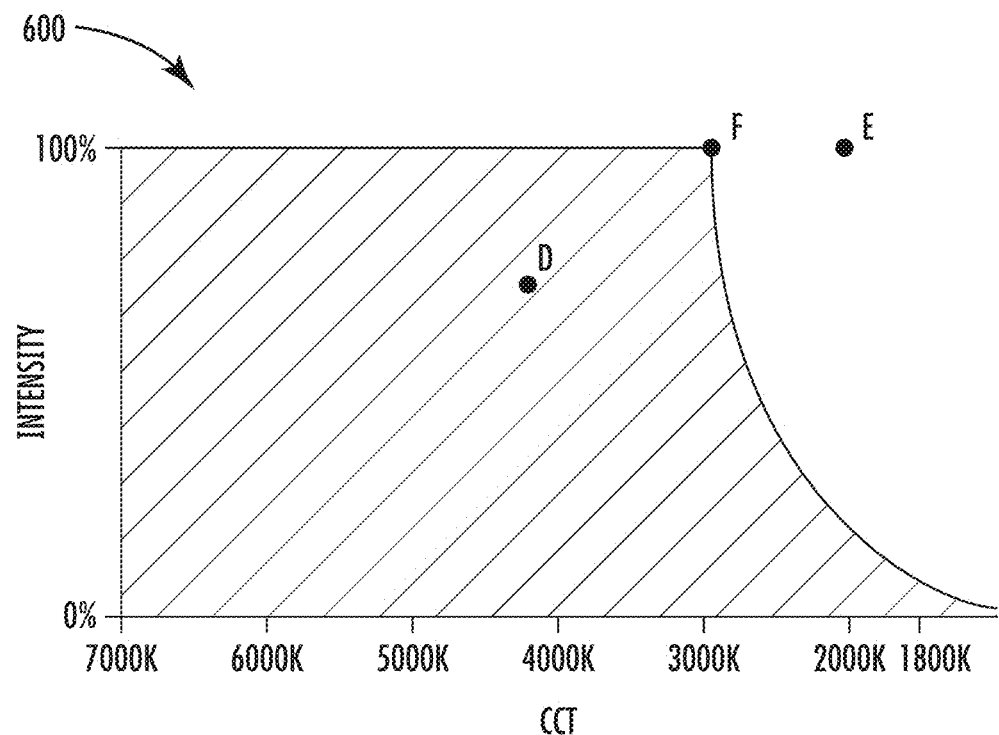
FIG. 6a is a chart of an exemplary range of allowed combinations related to a dual-handle implementation.

In a further implementation of the example dual-handle system depicted in FIG. 2b, the controller 211 may control the LED driver 231 such that the light output of the LED groups 221 is based on a combination of the values received from the handles 202 and 203. FIGS. 6a-6e may aid in understanding the exemplary implementation. In such an implementation, the controller 211 may be programmed to allow combinations of a particular range of color temperatures for a particular determined intensity, and/or a particular range of intensities for a particular determined color temperature. A non-limiting example of such allowed combinations is shown in FIG. 6a, such as the range of combinations within the shaded region of chart 600. In this type of implementation, the controller 211 may receive a value from the one or more handles 202 and 203. The controller 211 may determine from the received value a requested value that is associated with a requested intensity and a requested color temperature. The controller 211 may determine whether the requested color temperature and the requested intensity correspond to one of the allowed combinations of color temperature and intensity outputs. If the controller 211 determines that the requested color temperature and requested intensity correspond to an allowed combination of color temperature output and intensity output (such as point D on in FIG. 6*a*), the controller 211 may control the LED driver 231 to produce light output corresponding to the allowed combination of color temperature and intensity outputs. If the requested color temperature and requested intensity correspond to a combination outside of the allowed combinations of outputs (such as point E in FIG. 6*a*), the controller 211 may adjust one or both of the requested color temperature and requested intensity to obtain an allowed combination of color temperature and intensity outputs (such as point F in FIG. 6*a*), and the controller 211 may control the LED driver 231 to produce light output corresponding to the obtained combination of color temperature and intensity outputs. Adjustments to the requested color temperature and requested intensity to obtain an allowed combination of outputs may include adjusting the requested intensity to an appropriate allowed intensity for the requested color temperature; adjusting the requested color temperature to an appropriate allowed color temperature for the requested intensity; adjusting both the requested color temperature and intensity to an appropriate allowed combination; adjusting either color temperature and/or intensity in a non-linear manner; adjusting either color temperature and/or intensity based on which handle provided the received value; adjusting either color temperature and/or intensity based on additional input from a sensor or switch; or any other suitable type of adjustment.

As a first non-limiting example, the controller 211 may receive a value indicating a requested intensity of about 100% and a requested color temperature of about 2000K (such as point E in FIG. 6*a*). The controller 211 may determine that the requested intensity and color temperature do not correspond to one of the allowed combinations of outputs. In this example, the controller 211 may adjust the requested color temperature to about 3000K to obtain an allowed combination of intensity and color temperature outputs (such as point F in FIG. 6*a*).

Figure 6B:
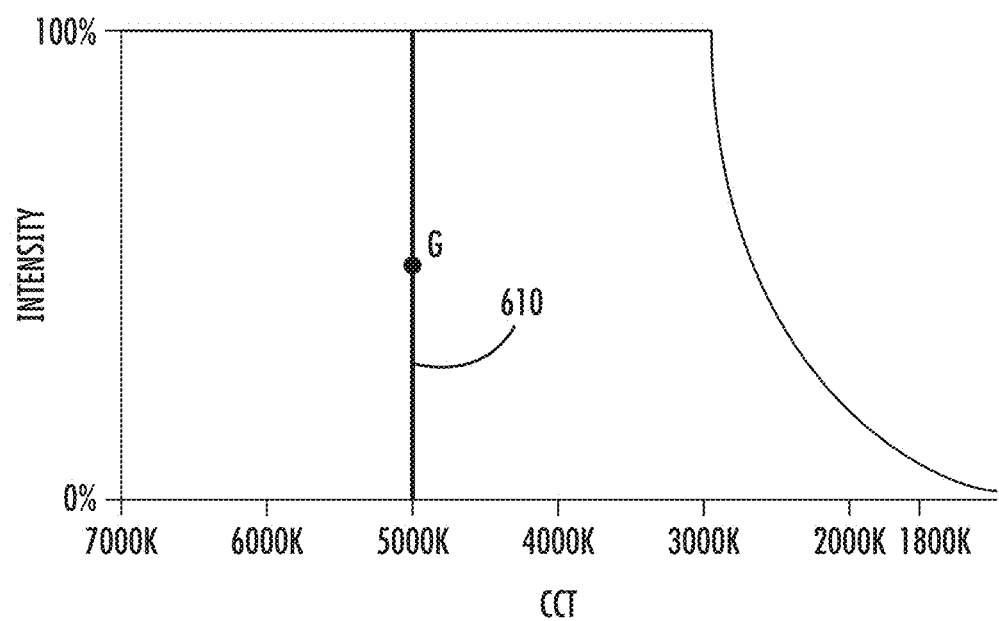
FIGS. 6b-6d are each a chart of exemplary paths of allowed combinations related to a dual-handle implementation.

In a second non-limiting example, based on values received from the first handle 202, the controller 211 may adjust the intensity of the light output across nearly the full range of possible intensity outputs while the color temperature level is set to a cooler value (such as path 610 in FIG. 6*b*). Additionally or alternatively, based on values received from the second handle 203, the controller 211 may adjust the color temperature across nearly the full range of possible CCT outputs while the intensity is set to a lower value (such as path 630 in FIG. 6*d*).

A further implementation of the example dual-handle system may comprise receiving a second value subsequent to a first value, while the produced light output corresponds to the first value. The produced light output may also correspond to an allowed combination at a limit of the available allowed combinations. For example, the produced light may correspond to an allowed combination of a maximum intensity and a relatively warm color temperature (such as point X in FIG. 6*e*). In this implementation, a second requested value may be determined from the second received value, and the second requested value may be associated with a second requested color temperature and a second requested intensity. The controller 211 may determine if the second requested color temperature and the second requested intensity correspond to a second allowed combination of outputs. If the second requested value corresponds to a combination outside of the range of allowed combination (such as point Z in FIG. 6*e*), the controller 211 may adjust one or both of the second requested color temperature and the second requested intensity to obtain a second allowed combination (such as point Y in FIG. 6*e*). The controller 211 may control the LED driver 231 to produce light output corresponding to the second allowed combination of outputs.

Further implementations are envisioned having additional handles for additional light parameters, wherein the additional light parameters may have a predetermined level and/or an allowed range. Additionally or alternatively, the available range of positions of one or both of handles 202 and 203 may be divided into zones of values as described in relation to the single-handle implementation, and values from the zones may adjust the additional light parameters. The controller 211 may control the LEDs 221 to produce light output based on the combination of intensity, color temperature, and/or the additional light parameters. The additional light parameters of the light output may include delta-uv (i.e., tint), color (e.g., red-green-blue blends), color rendering index (CRI), circadian stimulus, TM-30 metrics, spatial arrangements, or other parameters. For example, an implementation might adjust color temperature based on the range of a first handle, while a second handle adjusts intensity and circadian stimulus in various zones. A first zone could adjust intensity while circadian stimulus is at a constant level. A second zone could adjust circadian stimulus while intensity is at a constant level. In this example, adjusting the second handle in the second zone would affect circadian stimulus without changing CCT. In an additional example, an implementation might have a lighting fixture with multiple independent luminaires. For such an implementation, a first handle in a first zone could adjust intensity on the multiple luminaires in a sequence until all luminaires are at an intermediate intensity. In a second zone, the first handle could adjust intensity on all luminaires up to a maximum intensity. A second handle could adjust color temperature for one, some, or all of the multiple luminaires.

Figure 5:
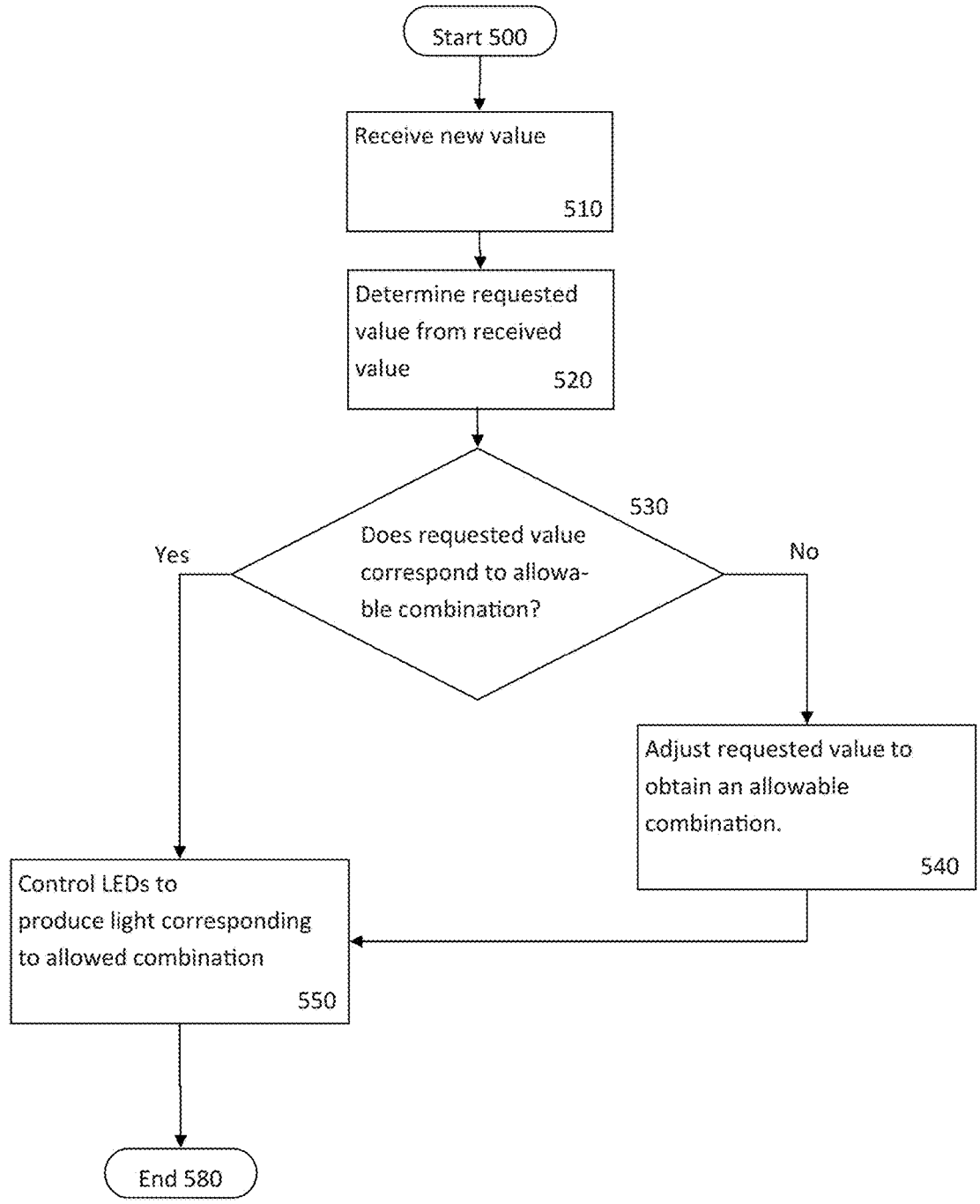
FIG. 5 is a flowchart representing exemplary steps for an implementation of dual-handle control by a programmed controller.

For a dual-handle implementation, the programming of the controller 211 may follow the flowchart depicted in FIG. 5. At starting point 500, the light output as controlled by the LED driver 231 may be in a default mode at a predetermined intensity and CCT, or it may be at the last known output, or the light fixture may be turned off. The controller 211 may receive at step 510 one or more values from either or both of the handles 202 and 203. The controller may determine a requested value from the received value at step 520, where the requested value is associated with a requested color temperature and intensity. The controller may determine at step 530 whether the requested value (and the associated requested color temperature and intensity) corresponds to an allowable combination of color temperature output and intensity output. If the requested value corresponds to an allowable combination, the controller at step 550 may control the LED driver to produce light output corresponding to the allowed combination. If the requested value does not correspond to an allowable combination, the controller at step 540 may adjust at least one of the requested color temperature and requested intensity to obtain an allowed combination; at step 550, the controller may control the LED driver to produce light output corresponding to the allowed combination that was obtained in step 540. After the light output is produced at step 550, the flowchart for the controller ends at ending point 580. If a further new value is received from either or both handles 202 and 203 (i.e., the user is still adjusting either handle), the controller may return to starting point 500 to follow the flowchart for the new value. If the received value is not being adjusted, the programming may end at step 580, and the controller may maintain the light output at the present color temperature and intensity. Additional steps relating to default modes, error-checking, or similar logical steps are envisioned, but are omitted from the example flowchart for clarity.

As described above in relation to FIG. 2b, an example range of allowed combinations of intensity and color temperature outputs is indicated by the shaded area on chart 600 in FIG. 6a. A requested value, as determined from a received value, may be associated with a requested color temperature and requested intensity that are within the range of allowed combinations (such as point D in FIG. 6a), or may be associated with a requested color temperature and requested intensity that are outside of the range of allowed combinations (such as point E in FIG. 6a). A requested value that is associated with a combination outside of the range of allowed combinations may be adjusted to obtain an allowed combination (such as point F in FIG. 6a).

Adjustments to the handles may result in the intensity and/or the color temperature of the light output to be adjusted within the range of allowed combinations, as determined by the controller. For example, if the light output is presently set to a color temperature of 5000K and an intensity of 50% (such as point G in FIG. 6b), adjusting a handle to a new associated intensity may adjust the light output between about 0% to about 100% intensity at the present color temperature of 5000K, as shown on path 610 in FIG. 6b.

Figure 6C:
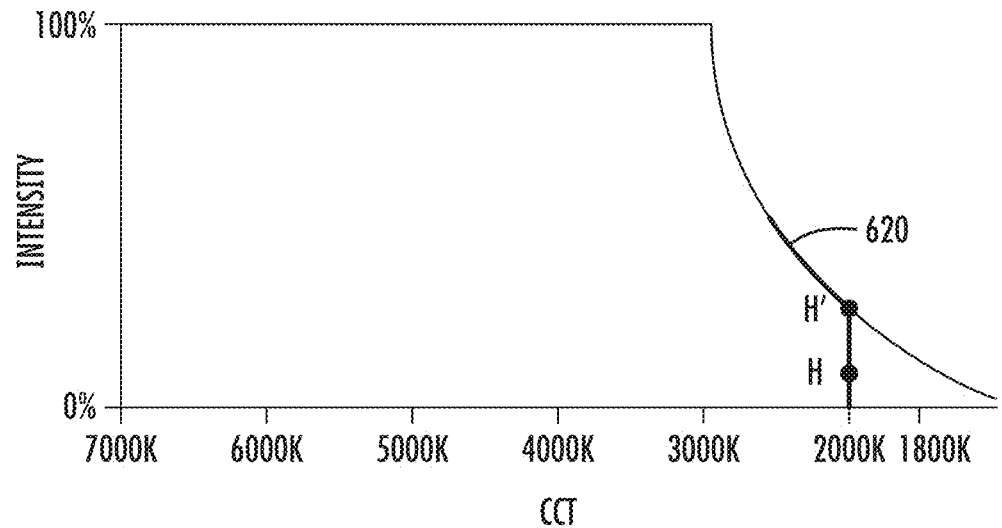
Figure 6D:
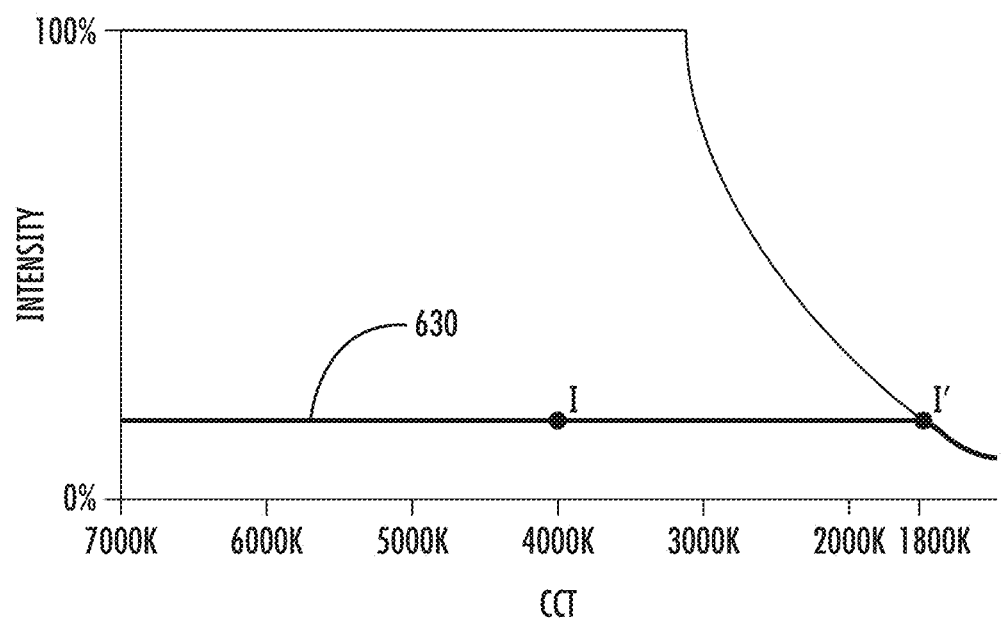
Figure 6E:
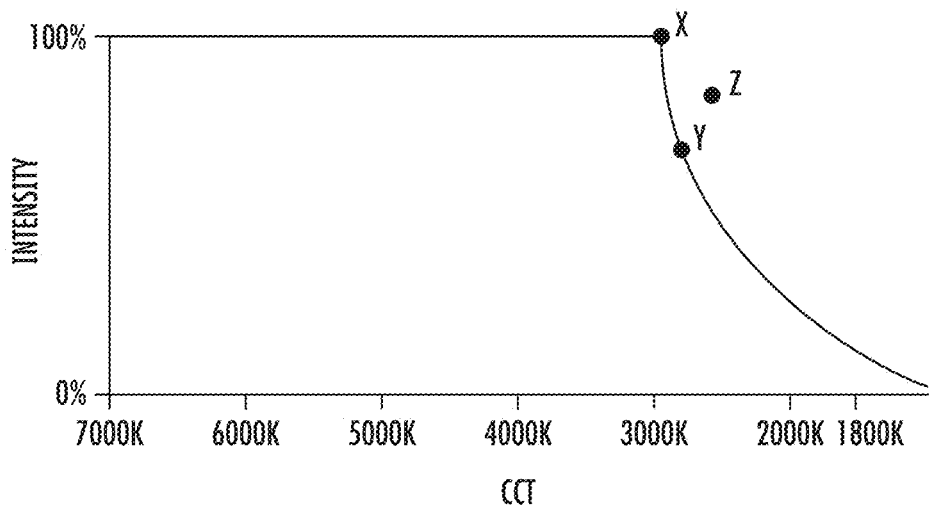
FIG. 6e is a chart of exemplary points illustrating allowed combinations related to a dual-handle implementation.

As an alternative example, as shown on path 620 in FIG. 6c, if the light output is presently set to a color temperature of 2000K and an intensity of 10% (such as point H in FIG. 6c), adjusting a handle to a new associated intensity may adjust the light output at the present color temperature from about 0% to about 25%. If the handle is adjusted beyond the position associated with about 25% intensity (such as point H' in FIG. 6c), the controller may adjust either or both of the requested intensity and color temperature to obtain an allowed combination, as shown on the path 620.

In an additional example, if the light output is set to a color temperature of 4000K and an intensity of 20% (such as point I in FIG. 6d), adjusting a handle to a new associated color temperature may adjust the light output at the present intensity from about 6000K to about 1800K. If the handle is adjusted beyond the position corresponding to about 1800K (such as point I' in FIG. 6d), the controller may adjust either or both intensity and color temperatures to obtain an allowed combination, as shown on the path 630.

Figure 7A:
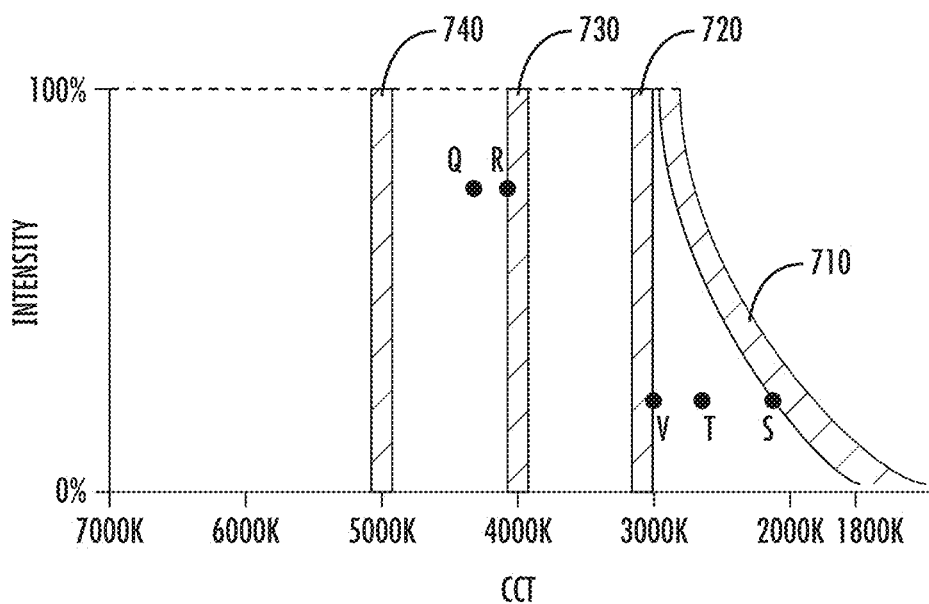
FIGS. 7a and 7b are each a chart of exemplary multiple discrete ranges of allowed combinations related to a dual-handle implementation.
Figure 7B:
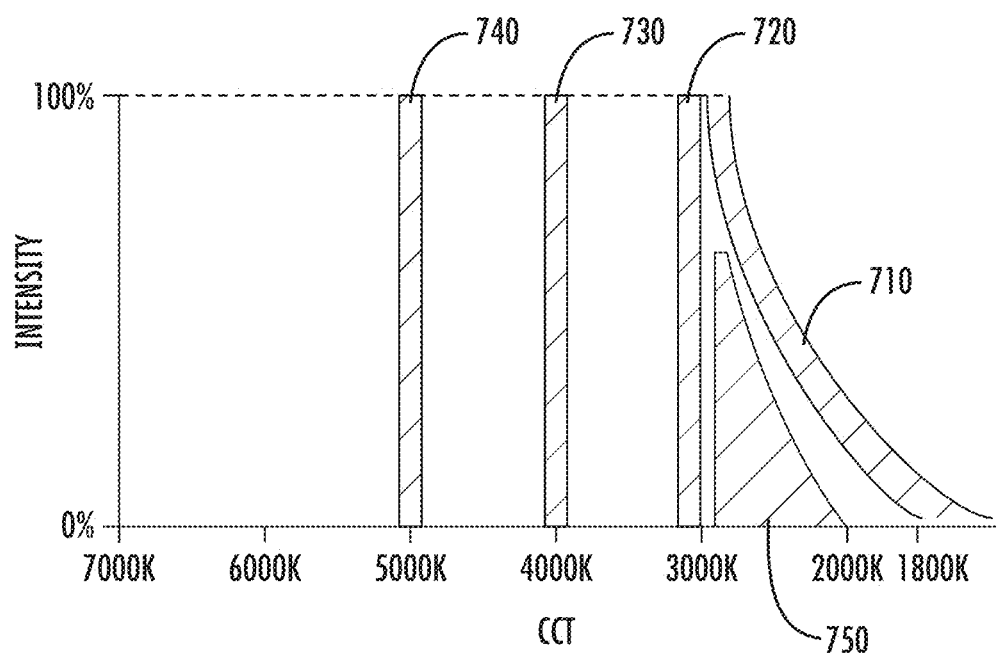

Ranges of allowed combinations of intensity and color temperature outputs may be continuous, as depicted in FIG. 6a, or may be discrete or stepwise, as depicted in FIGS. 7a and 7b. Exemplary ranges of allowed combinations are indicated by the shaded areas on the chart shown in FIG. 7a. Area 740 indicates allowed combinations at intensities between nearly 0% and nearly 100%, with a color temperature of about 5000K. Area 730 indicates allowed combinations at intensities between nearly 0% and nearly 100%, with a color temperature of about 4000K. Area 720 indicates allowed combinations at intensities between nearly 0% and nearly 100%, with a color temperature at or just above about 3000K. Area 710 indicates allowed combinations at intensities between nearly 0% and nearly 100%, with color temperatures between just below about 3000K to about 1800K. A requested value that is outside the ranges of allowed combinations (such as point Q in FIG. 7a) may be adjusted by the controller to obtain an allowed combination (such as point R). A requested value that is an allowed combination (such as point S) but which is followed by a requested value that is outside the ranges of allowed combinations (such as point T) may be adjusted by the controller to obtain an allowed combination in the next available range (such as point V). It will be understood by one skilled in the art that additional ranges, including ranges that include combinations at less than 100% intensity (such as area 750 in FIG. 7b) may be included without departing from the scope of the invention.

For all of the provided examples, implementations, and figures, the values, ranges, and thresholds are exemplary only, and may be changed without departing from the scope of the invention. The depicted and described relative positions of the handle controls are exemplary, and different relative positions may be used without departing from the described invention. In addition, the relative relation of a particular handle position, a particular control input or value, and/or a particular light output level may change during operation, for example in a dual-handle implementation.

The foregoing descriptions and examples are provided for purposes of illustrating, explaining, and describing aspects of the present invention. Further modifications and adaptations to these examples will be apparent to those skilled in the art and may be made without departing from the scope of the invention. The exemplary systems and methods represented here may be implemented independently, in conjunction with a different one of the systems described, or in conjunction with a system not described herein.

What is claimed is:

1. A lighting fixture, comprising:
   a controller configured for receiving one or more values from a handle and for controlling a driver,
   the driver configured for controlling a plurality of LEDs to produce light output having a color temperature and an intensity; and
   the plurality of LEDs;
   wherein when the controller receives a value from the handle, the controller:
      determines whether the received value is within a first zone of values;
      when the received value is within the first zone of values, instructs the driver to control the plurality of LEDs to produce light with a color temperature corresponding to the received value, and to an intensity based on the color temperature; and
      when the received value is outside the first zone of values, instructs the driver to control the plurality of LEDs to produce light with an intensity corresponding to the received value and to a color temperature corresponding to the received value.

2. The lighting fixture of claim 1, wherein the controller is further configured to:
   receive a second value, wherein the second value is outside the first zone of values and is different than the received value;
   determine a second color temperature corresponding to the second value and a second intensity corresponding to the second value, wherein the second color temperature is different from the color temperature and the second intensity is different from the intensity; and
control the plurality of LEDs to produce light with the second color temperature and the second intensity.

3. The lighting fixture of claim 1, wherein the controller is further configured to:
when the received value is inside the first zone of values, receive a second value, wherein the second value is within the first zone of values and is different than the received value; and
determine a second color temperature corresponding to the second value and a second intensity based on the second color temperature, wherein the second color temperature is different from the color temperature, and control the plurality of LEDs to produce light with the second color temperature and the second intensity.

4. The lighting fixture of claim 1, wherein:
the driver is further configured to control the plurality of LEDs to produce light output having an additional parameter, the additional parameter corresponding to one of a tint, a color, a color rendering index (CRI), a circadian stimulus, a TM-30 metric, or a spatial arrangement; and
the controller is further configured to receive an additional value from an additional handle, the received additional value associated with the additional parameter, and to instruct the driver to control the plurality of LEDs to produce light with a combination of the color temperature, the intensity, and the received additional value associated with the additional parameter.

5. The lighting fixture of claim 1, wherein the first zone of values corresponds to a range of color temperatures and the controller determines that the intensity based on the color temperature is different for different color temperatures within the range.

6. The lighting fixture of claim 1, wherein the first zone of values corresponds to a range of color temperatures and the controller determines that the intensity based on the color temperature is the same for all the color temperatures within the range.

7. The lighting fixture of claim 6, wherein values outside the first zone of values correspond to a range of intensities and the controller determines that the color temperature corresponding to the received value corresponds to a warmer color temperature than the range of color temperatures.

8. The lighting fixture of claim 6, wherein values outside the first zone of values correspond to a range of intensities and the controller determines that the color temperature corresponding to the received value is different for different intensities within the range of intensities.

9. A lighting fixture, comprising:
a controller configured for receiving one or more values from a handle and for controlling a driver,
the driver configured for controlling a plurality of LEDs to produce light output having a color temperature, an intensity, and an additional attribute; and
the plurality of LEDs;
wherein when the controller receives a value from the handle, the controller:
determines which zone of a plurality of zones includes the received value;
when the received value is within a first zone of values, instructs the driver to control the plurality of LEDs to produce light with a combination of a color temperature corresponding to the received value, and an intensity based on the color temperature;

when the received value is within a second zone of values, instructs the driver to control the plurality of LEDs to produce light with a combination of an intensity corresponding to the received value, and a color temperature corresponding to the received value; and
when the received value is within a third zone of values, instructs the driver to control the plurality of LEDs to produce light with a combination of a level of the additional attribute corresponding to the received value, and an intensity corresponding to the received value.

10. The lighting fixture of claim 9, wherein the additional attribute corresponds to one of a tint, a color, a color rendering index (CRI), a circadian stimulus, a TM-30 metric, or a spatial arrangement.

11. The lighting fixture of claim 9, wherein the controller is additionally configured to:
when the received value is within the first zone of values, determine a level of the additional attribute, the level based on the color temperature; and
instruct the driver to produce light with a further combination of the intensity, the color temperature, and the determined level of the additional attribute.

12. The lighting fixture of claim 9, wherein the controller is additionally configured to:
when the received value is within the second zone of values, determine a level of the additional attribute, the level based on either the color temperature or the intensity; and
instruct the driver to produce light with a further combination of the intensity, the color temperature, and the determined level of the additional attribute.

13. The lighting fixture of claim 9, wherein the controller is additionally configured to:
when the received value is within the third zone of values, determine a color temperature based on the level of the additional attribute; and
instruct the driver to produce light with a further combination of the intensity, the color temperature, and the determined level of the additional attribute.

14. A method for controlling light output of a light fixture, the method comprising:
receiving a value from a handle;
determining whether the received value is within a first zone of values;
when the received value is within the first zone of values, then determining a first color temperature corresponding to the received value, and controlling a plurality of LEDs to produce light with the first color temperature and a predetermined intensity; and
when the received value is outside the first zone of values, then determining a second color temperature and a second intensity that each correspond to the received value, wherein the second color temperature is warmer than the first color temperature and the second intensity is less than the predetermined intensity, and controlling the plurality of LEDs to produce light with the second color temperature and the second intensity.

15. The method of claim 14, further comprising:
receiving a second value following the received value, wherein the second value is outside the first zone of values and is different than the received value; and
determining a third color temperature and a third intensity, wherein the third color temperature is warmer than the second color temperature and the third intensity is less than the second intensity, and controlling the plurality of LEDs to produce light with the third color temperature and the third intensity.

16. The method of claim 14, further comprising:
receiving a second value following the received value, wherein the second value is within the first zone of values and is different than the received value; and
determining a third color temperature, and controlling the plurality of LEDs to produce light with the third color temperature and the predetermined intensity.

17. The method of claim 14, wherein the plurality of LEDs are capable of producing light output having an additional parameter, the additional parameter corresponding to one of a tint, a color, a color rendering index (CRI), a circadian stimulus, a TM-30 metric, or a spatial arrangement; and
the method further comprising receiving an additional value from an additional handle, the received additional value associated with the additional parameter, and controlling the plurality of LEDs to produce light having the additional parameter associated with the received additional value.

18. The method of claim 14, wherein the plurality of LEDs are capable of producing light output having an additional parameter, the additional parameter corresponding to one of a tint, a color, a color rendering index (CRI), a circadian stimulus, a TM-30 metric, or a spatial arrangement; and
the method further comprising:
determining whether the received value is within a second zone of values, the second zone of values being associated with the additional parameter, and
when the received value is within the second zone of values, controlling the plurality of LEDs to produce light having the additional parameter associated with the received value.

19. The method of claim 14, wherein a value determined to be within the first zone of values corresponds to color temperatures within a range of color temperatures at the predetermined intensity.

20. The method of claim 19, wherein a value determined to be outside the first zone of values corresponds to warmer color temperature than the range of color temperatures at the predetermined intensity.

21. The method of claim 19, wherein a value determined to be outside the first zone of values corresponds to lower intensities than the predetermined intensity.

\* \* \* \* \*